A. WILZIN.
MANUFACTURE OF GLASS BOTTLES AND IN GLASS SHAPING AND BLOWING MACHINE THEREFOR.
APPLICATION FILED MAR. 3, 1917.

1,325,388.

Patented Dec. 16, 1919.
7 SHEETS—SHEET 5.

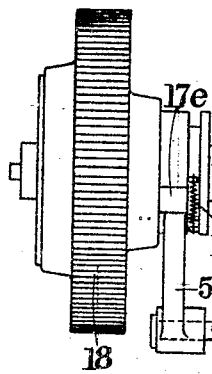
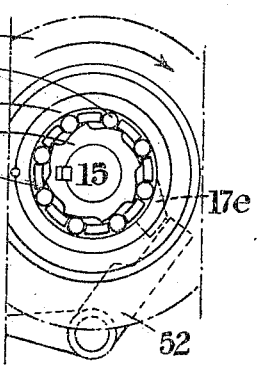
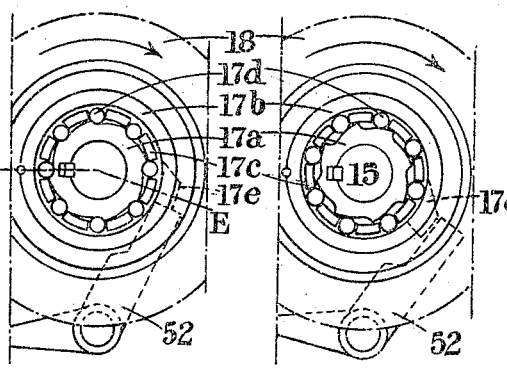
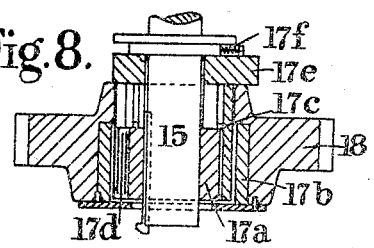
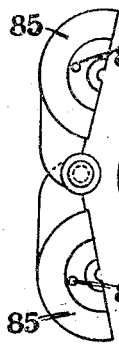
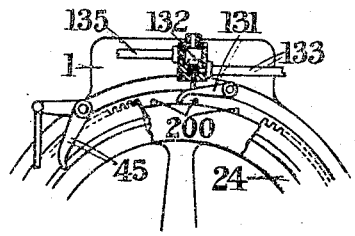

UNITED STATES PATENT OFFICE.

ARTHUR WILZIN, OF ST. OUEN, FRANCE.

MANUFACTURE OF GLASS BOTTLES AND IN GLASS SHAPING AND BLOWING MACHINE THEREFOR.

1,325,388.  Specification of Letters Patent.  Patented Dec. 16, 1919.

Application filed March 3, 1917. Serial No. 152,346.

*To all whom it may concern:*

Be it known that I, ARTHUR WILZIN, a citizen of the United States of America, and resident of St. Ouen, Seine, France, have invented new and useful Improvements in the Manufacture of Glass Bottles and in Glass Shaping and Blowing Machines Therefor, of which the following is a specification.

This invention has relation to the manufacture of hollow glass articles, for example, bottles, and herein so termed, and to glass shaping and blowing machines therefor.

The invention has reference to glass shaping and blowing machines of the kind in which the glass is introduced into the parison mold from above, either automatically or manually.

The invention further has reference to glass shaping and blowing machines of the kind more particularly described and ascertained in the specifications of Letters Patent of Great Britain No. 7183/12, dated 31st March, 1911, and No. 20299/13, dated 18th September, 1912, granted to the applicant herein in which, after the introduction of the glass into the parison mold from above, the several and subsequent operations of molding, stretching and blowing the parison and of cooling and ejecting the finished bottle, are performed automatically and in proper sequence, the durations of the several operations being capable of variation at will and being determined by a controlling device, the movement of which corresponds with the cycle.

The invention has for object to provide improvements in glass shaping and blowing machines of the kinds referred to and, *inter alia*, to provide such machines with automatic controlling means of such character and nature that they not only provide, but control and permit of variation, at will, in the duration of, the temperature equalization process to which the parison is submitted.

A glass shaping and blowing machine of the kind referred to is provided, in accordance with this invention, with automatic controlling means of such character and nature that they not only control and permit of variations, at will in the operations on, and in the durations of the sojourns of, the glass in the parison and finishing molds, and in the duration of the glass stretching period, but also control and permit of variation, at will, in the duration of the temperature equalization process to which the parison is submitted.

Further in a glass shaping and blowing machine of the kind referred to in accordance with this invention, the glass, after its introduction within the parison mold, comes under the influence of automatically controlled means which cause it to be forced into intimate contact with the walls of the parison mold so as to form a perfectly shaped parison, and then cause the parison to undergo a temperature equalization process prior to stretching.

Further in a glass shaping and blowing machine of the kind referred to, in accordance with this invention, the parison during the time it is stretching under the influence of gravity comes under the influence of automatically controlled means which cause the stretching to be assisted and expedited.

In order that the invention, the objects and nature of which have been set forth, may be clearly understood, a construction of machine in accordance with this invention will now be described with reference to, and by the aid of, the accompanying drawings, which are not to be regarded as more than diagrammatic, constructional and other details having been omitted for clearness of illustration.

Fig. 6 is a view of a detail;

Fig. 7 is an elevation of a clutch;

Fig. 8 is a section on the line E—E of Fig. 9; and Figs. 9 and 10 are side elevations of the clutch in the declutched and clutched positions respectively;

Fig. 11 is a plan view, showing, in detail, the parison mold, the neck mold and the finishing mold.

Figure 1:
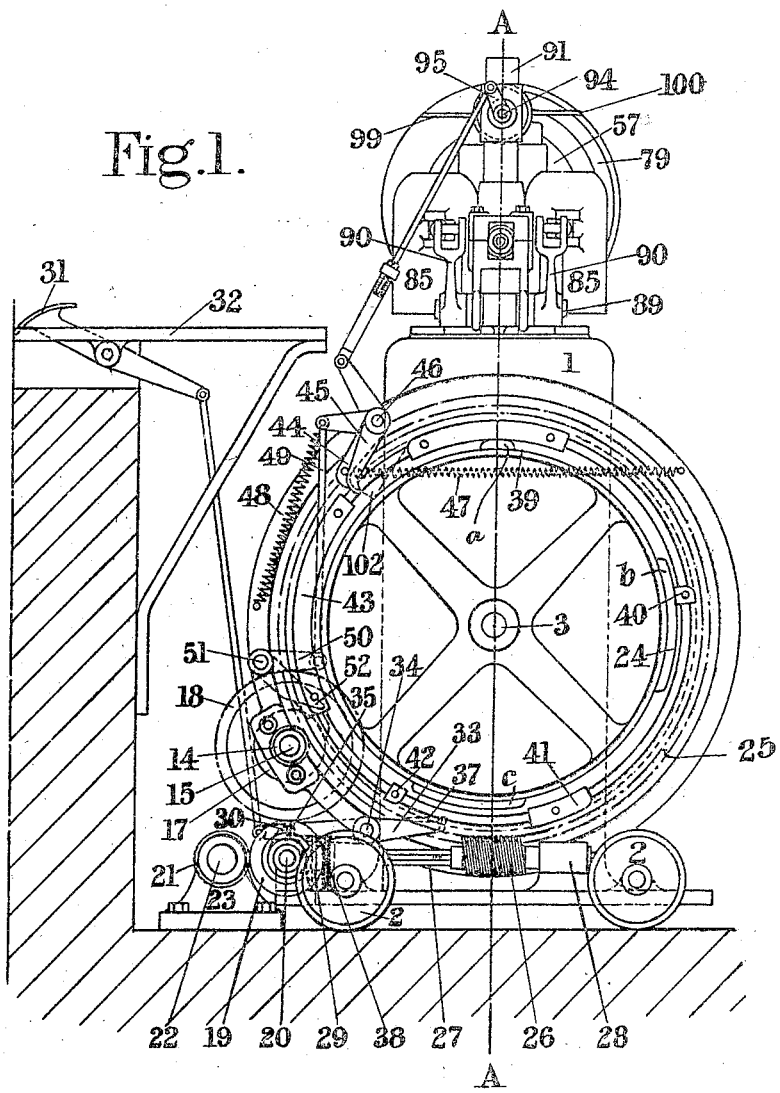
Figure 1 is a side elevation.
Figure 2:
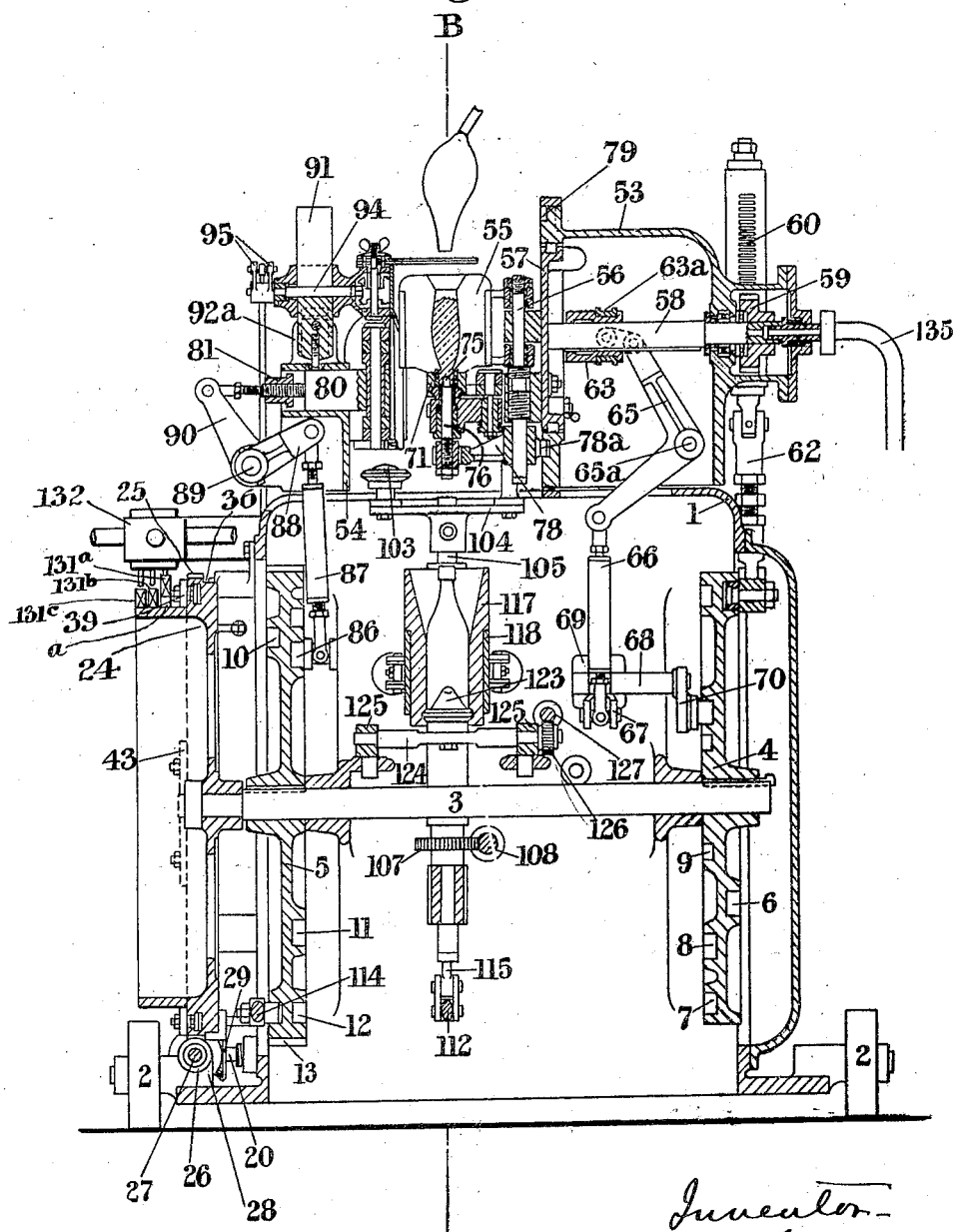
Fig. 2 is a section on the line A—A of Fig. 1.

1 is the main frame of the machine; this framing is mounted on wheels 2 so that the machine as a whole can be easily traversed. 3 is a shaft carried in bearings in the framing 1 and having fixedly mounted thereon two disks 4 and 5; the disks 4, 5 and shaft 3 thus rotate as one. The disk 4 is formed on one face with a cam groove 6 and on its other face with cam grooves 7, 8 and 9. The disk 5 is also formed on one face with a cam groove 10 and on its other face with cam grooves 11 and 12; in addition, the disk 5 has, on its periphery, teeth 13 which mesh with a pinion 14 fast on a shaft 15 mounted in pedestals 16 secured to the framing 1. In Fig. 1, the pedestal 16 is omitted for clearness of illustration. The shaft 15 is under the control of a clutch 17. This clutch is illustrated in detail in Figs. 7 to 10 inclusive, and comprises a sleeve $17^a$ having inclined faces, a ring $17^b$ and a circular cage $17^c$ carrying rollers $17^d$. The sleeve $17^a$ is connected with the shaft 15, and the ring $17^b$, which is concentric with the sleeve $17^a$, is integral or connected with a spur wheel 18 meshing with a pinion 19 loose on a shaft 20 mounted in the pedestals 16. The cage $17^c$ is positioned between the sleeve $17^a$ and the ring $17^b$; and its arrangement is such that the rollers $17^d$ can be caused to establish or break connection between the sleeve $17^a$ and the ring $17^b$. In mesh with the pinion 19 is another pinion 21 which is fast on a shaft 22 mounted in pedestals 23. The shaft 22 is driven continuously by an electric motor or other prime mover. Owing to their arrangement, the pinions 21, 19 and spur wheel 18 are always in motion. The cage $17^c$ has a lateral projection $17^e$: $17^f$ is a spring connected at one end with this projection and at the other end with the shaft 15; the arrangement is such that the spring pulls on the cage $17^c$ and tends to move it in relation to the shaft 15 and so that the rollers $17^d$ travel up the inclined faces of the sleeve $17^a$ and become wedged between such faces and the ring $17^b$, thereby establishing connection between these two members. The clutch 17 is normally inoperative, but when rendered operative by the action of a clutch latch 52, as hereinafter explained, the shaft 3 and disks 4, 5 are driven as the spur wheel 18 is clutched to the shaft 15. The clutch latch 52 is capable of assuming one or other of two positions; in the one position, it lies in the path of the projection $17^e$ and holds the cage $17^c$ in such position that the rollers $17^d$ cannot become wedged between the ring $17^b$ and the inclined faces of the sleeve $17^a$. The spur wheel 18 is thus disconnected from the shaft 15 and rotates in relation thereto. In the second position of the clutch latch 52, it is clear of the projection $17^e$; the spring $17^f$ is therefore operative and causes the cage $17^c$ to move in relation to the shaft 15 and wedge the rollers $17^d$ between the inclined faces of the sleeve $17^a$ and the ring $17^b$. When this happens, the shaft 15 is clutched to the spur wheel 18 and is driven thereby. The clutch latch 52 is controlled and operated from an automatic device which comprises, *inter alia*, a wheel 24 loosely mounted on the shaft 3. The control wheel 24 has, on one portion of its periphery and extending around the whole of its circumference, teeth 25 that are adapted to mesh with a worm 26 on a shaft 27 mounted in bearings 28 secured to the framing 1. The shaft 27 is geared to the shaft 20, bevel gearing 29 being used for the purpose. The pinion 19, which, as before stated, is loose on the shaft 20, is integral or connected with one member of a clutch 30, the other member of which is connected with the shaft 20. The clutch 30, which is similar in construction and operation to the clutch 17 (Figs. 7 to 10), is normally inoperative, but when rendered operative as hereinafter explained, the control wheel 24 is driven as the continuously rotating pinion 19 is clutched to the shaft 20. The clutch 30 is operated from a pedal 31 pivotally mounted on a platform 32 and connected by a link with one end of a lever 33 fulcrumed on a pin 34 mounted on the framing 1. The disposition of the lever 33 in relation to the control wheel 24 is such that one end thereof always bears on the peripheral portion 36 of the control wheel 24 (Fig. 2). It will be seen from Fig. 2 that the periphery of the control wheel 24 is divided into two portions, one having teeth 25 and the other, 36, not so provided. The lever 33 is also of such length that the end connected with the pedal 31 extends over the shaft 20 and is provided with a clutch latch 35 that is adapted to put the clutch 30 into and out of operation in manner similar to the clutch latch 52 of the clutch 17. 37 is a recess in the peripheral portion 36 of the control wheel 24, and 102 is another recess in the said portion. The recessses 37, 102 are not in one and the same plane. The peripheral portion 36 has also mounted on it one or more removable and adjustable pins 200 (Fig. 6); these pins are in one plane, but this plane is different to those containing the recesses 37, 102. The recess 37 is in such a plane that the end of the lever 33 which bears on the peripheral portion 36 on the control wheel 24, can engage therein. When so engaged, the control wheel 24 is held against rotation in one direction and the lever 33 occupies such a position that the clutch latch 35 holds the clutch inoperative. When the lever 33 is disengaged from the recess 37 and bears on the peripheral portion 36, the lever 33 occupies a position in which the clutch latch 35 is clear of the clutch 30 which clutch is therefore operative. 38 is a spring connected at its ends to the lever 33 and to the framing 1, and holding the lever with its one end in contact with the peripheral portion 36 or in the recess 37 of the control wheel 24. When the pedal 31 is depressed, the lever 33 is moved against the action of the spring 38, so that its one end is moved out of the recess 37 and the clutch latch 35 allows the clutch to become operative. The control wheel 24 is thus unlocked and is driven by the clutching of the pinion 19 to the shaft 20. The clutch 30 is maintained operative until the recess 37, in the course of the revolution of the control wheel 24, comes opposite the end of the lever 33. When this happens, the spring 38 forces the lever 33 to turn about its fulcrum so that the one end of the lever enters the recess 37 and the clutch latch 35 moves to a position in which it holds the clutch 30 inoperative. It will be understood from the foregoing that the control wheel 24 on the depression of the pedal 31 makes a complete revolution and that it is stopped by the declutching of the clutch 30 and the engagement of the lever 33 in the recess 37. It will also be understood that the gatherer, after he has depressed the pedal 31, does not require to maintain the same depressed, after the control wheel 24 has been set in motion, because the lever 33 will be held by contact with the peripheral portion 36 of the control wheel in such a position that the clutch latch 35 will be inoperative and the clutch 30 operative until the recess 37 again comes opposite the end of the lever 33 and permits the spring 38 to move the lever about its fulcrum.

In addition to the recesses 37, 102 and pins 200, there is mounted upon the control wheel 24 a plurality of dogs 39, 40, 41, 42 and 43. These dogs are of different lengths and their mounting is such that it permits of their relative adjustment being altered and also of their removal and replacement by others of different lengths. 45 is a bell crank lever: this lever is fulcrumed on a pin 46 mounted on the framing 1 and under the action of a spring 48. 44 is another bell crank lever fulcrumed on pin 46 and which is under the action of a spring 47. The one arm of the bell crank lever 44 bears on the peripheral portion 36 of the control wheel 24 in the plane containing the recess 102. The one arm of the bell crank lever 45 coöperates with the dogs 39—43, and the second arm of this lever is connected by a link 49 to a lever 50 keyed upon a shaft 51 carrying the clutch latch 52 which puts the clutch 17 into and out of operation. When the control wheel 24 is rotated, the dogs 39—43 pass successively under the first arm of the bell crank lever 45 and operate the same: the movements of the bell crank lever 45 in turn affect the clutch latch 52 and put the clutch 17 into and out of operation in the manner already described. As before stated, the clutch 17 is normally inoperative; it is only operative when one of the dogs 39—43 is passing under the first arm of the bell crank lever 45, and when operative connects the shaft 22 with the shaft 3, which is driven as also are the disks 4, 5. The clutch latch 52 shown in Figs. 7, 9 and 10 differs slightly in shape from that shown in Fig. 1, but it will be understood that Figs. 7 to 10 inclusive are only intended to illustrate the type of clutch employed.

The gearing through which the disks 4, 5 are driven, is such that they each make a complete revolution in the same time as the control wheel 24. Unlike the control wheel 24, their motion is not continuous but is intermittent, and the distance through which they advance at each movement is dependent upon the lengths of the dogs 39—43, one or other of which is, at the time pushing against the bell crank lever 45.

53, 54 are two casings mounted upon the upper part of the framing 1. The casing 53 carries the parison mold 55 and contains members intended to open and close this mold, which is made in two halves as usual, and to effect a rotational movement thereof through 180°. The two halves of the parison mold 55 are mounted upon a spindle 56 that is adjustable vertically and is carried in bearings on a plate 57 adapted and arranged to rotate within the casing 53. To the plate 57 is attached the one end of a hollow shaft 58 that is mounted at its other end in a bearing in the casing 53, and has, at the said end, a pinion 59 that meshes with a rack bar 60 movable vertically in a guide. The rack bar 60 is operated from and by the cam groove 6 of the disk 4 through the medium of a connecting rod 62, which is adjustable as to length. The shape of the cam groove 6 is such that, as the disk 4 makes its rotational movement, it imparts a down and up movement to the rack bar 60. This rectilineal movement is converted into rotary motion by the pinion 59 and is imparted through the shaft 58 to the parison mold 55. The cam groove 6 and the gearing 59, 60 are further such that the parison mold 55 is moved in a rotary sense first in one direction through 180 deg., and then in the opposite direction through a like angle, these two movements taking place during one complete rotational movement of the disk 4.

Mounted upon the shaft 58 so as to rotate therewith and yet be capable of longitudinal movement relatively thereto, is a sleeve 63 connected by adjustable links 64, which pass through openings 57ª in the plate 57, with the two halves of the parison mold 55. The sleeve 63 is embraced by a collar 63ª: the collar and sleeve are capable of relative rotation. The collar 63ª is connected by links with one arm of a bell crank lever 65 fulcrumed on a shaft 65ᵃ mounted in the casing 53. The second arm of the bell crank lever 65 is connected by a compensator rod 66 to a lever 67 keyed upon a shaft 68 mounted in a bearing 69 on the framing 1 and having an arm 70 that engages the cam groove 8 of the disk 4. The shape of the cam groove 8 is such that it imparts, during the rotational movement of the disk 4, an oscillatory movement to the shaft 68, which oscillatory movement imparts, through the connections described, endwise movements to the sleeve 63. The endwise movements of the sleeve 63 affect the parison mold, the two halves of which are caused to open or close.

The plate 57 also carries the neck mold 71. This neck mold is made in two halves held together by a spring 71ᵇ (Fig. 11). The neck mold is opened at the appropriate time by the finishing mold as is hereinafter explained. The two halves of the neck mold 71 are mounted upon a spindle 72, which is carried in an externally screw-threaded sleeve 73ᵃ. This sleeve 73ᵃ is mounted in a screw-threaded hole formed in a member 73 which is mounted upon two parallel rods 74, 74ᵃ that are attached to, and extend at right angles from the face of, the plate 57. The member 73 is slidably mounted upon the rods 74, 74ᵃ. The neck mold 71 is so formed that it embraces a circular boss or projection on the member 73 as clearly shown in Fig. 3. By screwing the sleeve 73ᵃ up or down in the member 73 and by sliding the member 73 longitudinally of its bearers 74, 74ᵃ, the neck mold 71 may be adjusted in two directions in relation to the parison mold 55.

75 is the usual plunger: this plunger is secured upon the one end of a rod 76 that is screw-threaded at its other end and is mounted in a thimble 77 which is itself slidably mounted in a forked arm 78 so as to be adjustable longitudinally thereof. The arm 78 is mounted on the spindle 56 so as to be movable longitudinally thereof and has a rearward extension or roller 78ᵃ that engages a cam groove 79 formed in the casing 53. From the foregoing description, it will be understood that when the neck mold 71 and member 73 are adjusted horizontally in relation to the parison mold 55, that the rod 76 will be moved simultaneously therewith and to a like extent and in the same direction. When the plate 57 is moved in a rotary sense by the means herein described, the arm 78 moves therewith and is also moved relatively to the spindle 56: this latter movement is due to the shape of the cam groove 79 and its action on the rearward extension or rollers 78ᵃ of the arm 78.

The member 73 is formed with an opening that is closed at one end by a gland through which extends the rod 76: the rod 76 is movable longitudinally in relation to the member 73. It has been stated that the shaft 58 is hollow: this shaft is connected at one end with a tube 135 and at the other end is connected through suitable ducts with the opening in the member 73 which contains a portion of the rod 76. The tube 135, and therefore the hollow shaft 58 and ducts in connection therewith, is in connection with a triple valve casing 132; by means of the valves of the triple valve casing 132 the opening in the member 73 may be connected with a source of negative pressure or with one or other of two supplies or sources of air under different pressures.

80 is a block that is slidably mounted in the casing 54 and the position of which is adjustable by means of a nut 81 that engages the casing 54 and works on a screw-threaded rod 82 extending from the outer end of the block 80. The block 80 serves as a carrier for the two shells 85 of the finishing mold and for this purpose is formed with a screw-threaded hole in which is mounted a hollow screw 83. In the screw 83 is mounted a spindle 84 on which the two shells 85 are mounted. By means of the nut 81 and screw 83 the finishing mold can be adjusted horizontally and vertically. The shells of the finishing mold are opened and closed at the appropriate times by mechanism operated from and by the cam groove 11 of the disk 5: this mechanism comprises a member 86 in engagement with the cam groove 11 and connected by a compensator rod 87 with a lever arm 88 fixedly mounted upon a shaft 89 carried in bearings in the casing 54. On the shaft 89 are fixedly mounted two other lever arms 90, each of which is linked with a shell 85 of the finishing mold. The two shells of the finishing mold each carries at its upper part a projection 85ᵃ (Fig. 11): these projections are intended to produce, at the proper moment, the opening of the neck mold 71. 71ᵃ are locking members pivotally mounted on the constituent parts of the neck mold 71 and each kept up against a stop by the spring 71ᵇ.

91 is a column mounted upon the upper part of the casing 54. This column, which carries the shearing apparatus, is pivotally mounted upon a pin 92 carried by brackets 92ᵃ. 93 is a spring pin mounted in the lower end of the column 91 and adapted normally to engage in a hole formed in the casing 54. When the pin is so engaged the column 91 is held vertically, as shown, but when disengaged, the column is released and is free to be turned backward about the pin 92 so as to permit and facilitate the dismantling and replacement of the parison mold, the neck mold and the finishing mold. 94 is a shaft mounted in the column 91 above its pivot pin 92: to one end of the shaft 94 is or are connected an arm or arms 95 that is or are linked to the bell crank lever 44. On the other end of the shaft 94 is mounted a bevel wheel 96 that meshes with two oppositely disposed bevel wheels 97, 98. To the bevel wheels 97, 98, the blades 99, 100 of the shearing apparatus are connected. The shearing apparatus is operated once in, and at the commencement of, each rotation of the control wheel 24 by the dropping of the first arm of the bell crank lever 44 into the recess 102 under the pull of the spring 47. The movement of the bell crank lever 44 operates, through the link and arm or arms 96, the shaft 94, which, through the bevel wheel 97, actuates the bevel wheels 97, 98: these bevel wheels 97, 98 are rotated in opposite directions, which movement causes the shearing blades 99, 100 to move toward one another to cut off the string of glass depending from the gathering rod. As the control wheel 24 rotates, the recess 102 moves away from the first arm of the bell crank lever 44 and this arm eventually comes on to the peripheral portion 36 of the control wheel 24. The movement of the bell crank lever 44 out of the recess 102 causes the shaft 94 to be operated in a direction which causes the shearing blades 99, 100 to be moved apart: the shearing blades 99, 100 are maintained separated until the first arm of the bell crank lever 44 drops at the commencement of the next rotational movement of the control wheel 24, into the recess 102.

101, 103 are the two bottom molds: the one, 101, is adapted and arranged to close the bottom of the parison mold, and the other, 103, to close the bottom of the finishing mold. The bottom molds 101, 103 are mounted on a common support 104, which, in turn, is mounted on a spindle 105. This spindle 105 is arranged so as to be capable of rotary and of vertical movements. The rotary movements have for object to present the bottom molds alternately underneath the parison and finishing molds, and the vertical movements to place the bottom molds in their operative and idle positions. To these ends, the spindle 105 is slidably mounted in brackets 106 on the framing 1 and has mounted upon it a pinion 107. The pinion 107 is so mounted upon the spindle 105 that it can impart rotary motion thereto, but cannot follow it in its endwise movements. The pinion 107 meshes with a rack bar 108 that is mounted in bearings 109 in the framing 1. The rack bar 108 is linked to a lever 110 fixedly mounted upon a shaft 111 mounted in bearings in the framing 1. Upon the shaft 111 is mounted another lever, not shown, which engages and is operated from and by the cam groove 12 of the disk 5. The vertical movements of the spindle 105 are effected by a lever 112 that is connected with a sleeve on a shaft 113 mounted in bearings on the framing 1. To the sleeve is connected another lever 114 that engages and is operated from and by the cam groove 10 of the disk 5. The lever 112 is not connected directly with the lower end of the spindle 105, but is linked to a rod 115 between the end of which and the spindle 105 is interposed a spring 116 that is contained in the lower end of the rod. By this arrangement, the bottom molds 101, 103 are resiliently supported and an automatic compensation is provided so that the bottom molds shall adapt and seat themselves properly in relation to the molds with which they coöperate.

Below and in alinement with the axes of the parison and finishing molds is located a cooling pot 117, which is formed in two halves, each half being carried by a shell 118 articulated about a sleeve 119 surrounding the spindle 105 and mounted in and carried by the upper and middle brackets 106. The movements of the shells 118 are effected by rods 120 that are adjustable as to length and are connected to a lever 121 mounted on a shaft 122 to which is connected another lever that engages and is operated by the cam groove 9 of the disk 4.

123 is the bottom of the cooling pot 117: this bottom is secured upon a transverse shaft 124 that is mounted in bearings 125 in the framing 1. The shaft 124 has, at one end, a pinion 126 that meshes with a rack bar 127 slidable in bearings 128 in the framing 1 and connected to one end of a lever 129 mounted upon the shaft 113 and connected through a sleeve with another lever on said shaft engaging and operated by the cam groove 7 of the disk 4. The rotary movement of the shaft 124 has for object to deliver the bottle to the slideway 130 after the cooling in the cooling pot.

131[a], 131[b] and 131[c] are three parallel and juxtaposed levers pivotally mounted on the framing 1, one of which levers is adapted and arranged to be actuated by the pins 200 and the others by dogs $a$, $b$ and $c$ movably attached to the control wheel 24. Each of the above mentioned levers is arranged to coöperate with and actuate the spindle of a valve, each and every time it is actuated by a pin 200 or by one of the dogs on the control wheel 24. The valves, of which there are three, are juxtaposed and arranged one behind the other in the triple valve casing 132 to which three parallel pipes 133 are connected and so disposed that each is controlled by a valve. One of the pipes 133 is connected with the source of low or negative pressure, the second with a source or supply of air under low pressure and the third with a source or supply of air under higher pressure. The pipe 135 connects the triple valve casing 132, as already described, with the opening in the member 73 in which the rod 76 moves longitudinally. By this arrangement, a source of negative pressure or air under two different pressures may be placed in connection with the parison or finishing molds at appropriate times for the purposes herein set forth.

The operation of the machine thus far described is as follows:—

Figure 4:
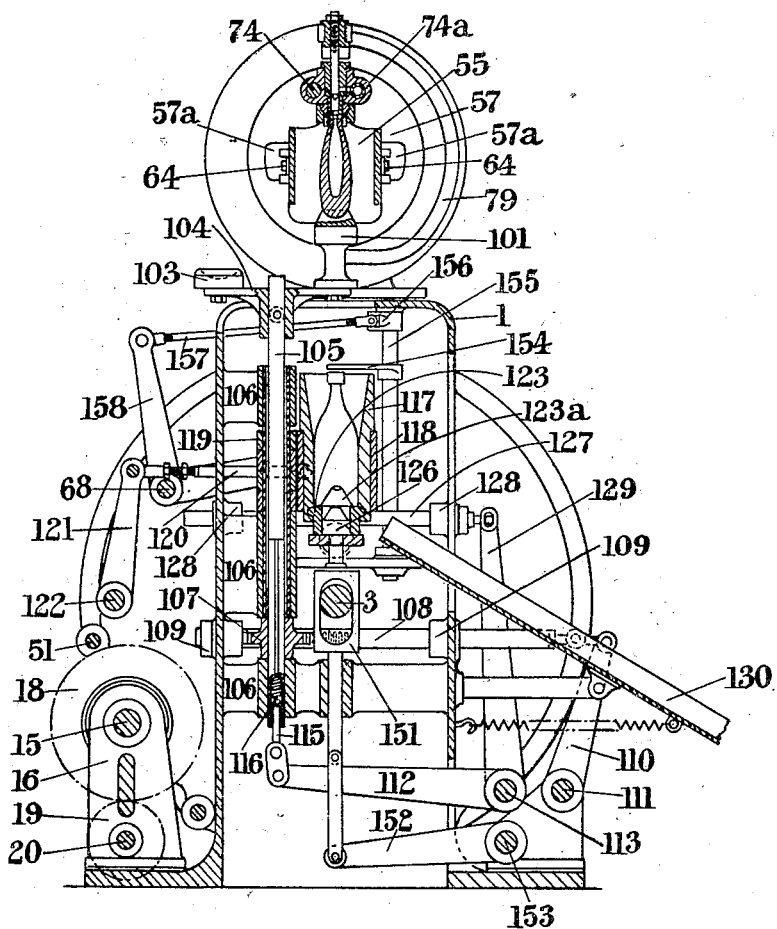
Fig. 4 is a section on the line B—B of Fig. 2, but shows the parison mold reversed so as to have its opening below.
Figure 5:
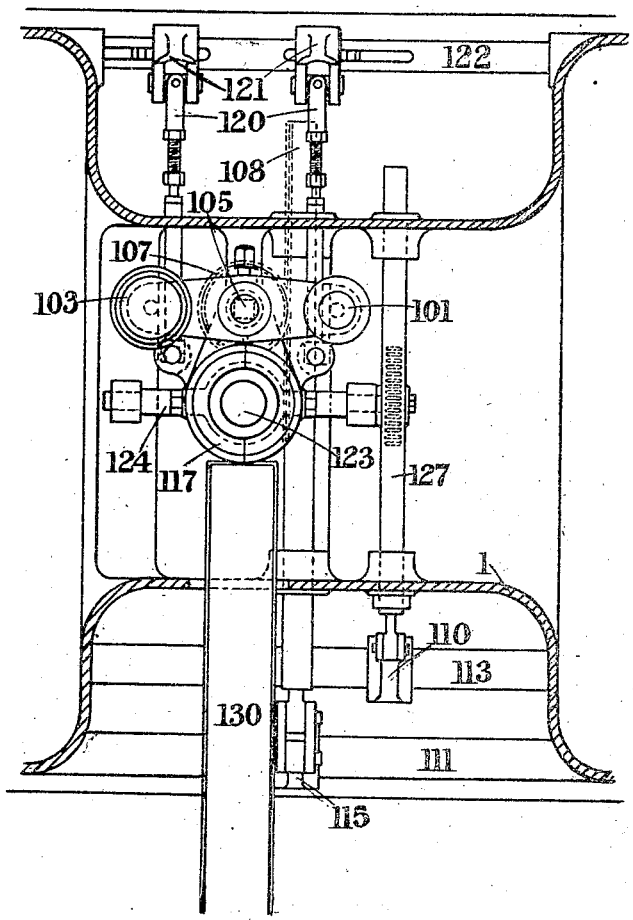
Fig. 5 is a plan view showing the relative positions of certain parts of the machine.

The gatherer with his gathering rod takes from the furnace a quantity of glass sufficient for the article to be blown and drops it into the parison mold 55 which, at this time, is in the position shown in Fig. 2. The glass drops from the gathering rod in the form of a "rope" or "string" which superposes itself in spirals within the parison mold, thus touching its walls in spots or zones only. The supply of glass to the neck mold 71 is insured by the fact that the interior of this mold is, when the control wheel 24 is in the position shown in Fig. 1, in connection with the source of negative pressure, the appropriate valve in the valve casing 132 being maintained open by the corresponding dog on the control wheel 24. As soon as sufficient glass for the particular article to be shaped and blown has been introduced into the parison mold, the gatherer depresses the pedal 31, which action throws the clutch 30 into action and clutches the pinion 19 to the shaft 20 so that the controlling wheel 24 is driven. As soon as the controlling wheel 24 is set in rotation, the source of negative pressure is cut off from the neck mold 71 and the recess 102 comes under the first arm of the bell crank lever 44 which drops thereinto under the pull of the spring 47. The movement of the bell crank lever 44 is transmitted through the mechanism already described to the shaft 94 which is rotated and in turn rotates the bevel wheels 96, 97, 98. The rotation of the bevel wheels 96, 97, 98 sets the shearing blades 99, 100 in movement and causes them to move together and separate the "rope" or "string" of glass depending from the gathering rod. The continued onward movement of the controlling wheel 24 actuates the bell crank lever 44 in the opposite direction and causes the shearing blades 99, 100 to move apart. The dog 39 on the controlling wheel 24 now comes into action and actuates the bell crank lever 45, thereby throwing the clutch 17 into action and clutches the pinion 14 to the shaft 15 so that the disks 4, 5 and shaft 3 are driven. The rotation of the disk 4 causes its cam groove 6 to act on the mechanism comprising the rack bar 60 and pinion 59 and rotate the parison mold 55 through 180 deg. While the parison mold is being rotated, the cam groove 79 acts on the arm 78 and causes the plunger 75 to move outward of the neck mold, thus freeing the cavity formed by it in the parison, which is thereby rendered ready to be acted upon by air under pressure. The parison mold 55 is then in the position shown in Fig. 4. The rotation of the disk 5 through its cam groove 10 also causes the bottom mold 101 to be moved through the mechanism described into a position to close what is now the lower end of the parison mold 55. By this time the dog 39 is just moving clear of the bell crank lever 45 and when clear the clutch 17 at once becomes inoperative and the shaft 3 with disks 4, 5 is stopped. While the controlling wheel 24 is moving onward to bring the dog 40 into action, one out of the other set of dogs movably attached to the control wheel 24 comes into action and opens its valve in the triple valve casing 132 so allowing air to pass from the source or supply of air under high pressure through the pipe 133 to the mold 71 and act on the cavity formed by the plunger 75 in the glass therein. As has been stated the glass when introduced into the parison mold superposes itself therein in spirals, thus touching its walls in spots or zones only, which spots or zones chill and "set" owing to metallic contact, whereas the intervening parts of the parison remain much hotter and more malleable. When a parison formed under such conditions is allowed to stretch (so as to attain the requisite length for finish blowing) the hotter and more malleable portions thin out considerably more than those which had contacted first and longest with the parison mold, thereby producing such considerable variations in the thickness of the walls of the parison as will not disappear in the finish blowing, and thus rendering the bottle less resistant to heat and pressure and less perfect also in appearance. By the introduction of air under high pressure into the parison as soon as it is entirely closed in, the entire outer surface of the parison is caused to contact with the parison mold, thereby rendering the initial differences of temperature and malleability due to the incomplete filling of the parison mold less considerable.

The dog on the control wheel 24 operating the high pressure air inlet valve of the triple valve casing 132 comes out of operation just as or before the dog 40 reaches and actuates the bell crank lever 45 to render the clutch 17 again operative. The disks 4, 5 being again set in rotation, the cam groove 8 of the disk 4 causes the opening of the two halves of the parison mold 55 through the mechanism, 63, 63ª, 65, 66, 67, 68 and links 64, thus freeing the main body of the parison from metallic contact but leaving it supported by and between the bottom mold 101 and the neck mold 71. The parison is so maintained from the time that the dog 40 clears the bell crank lever 45 and until the dog 41 comes in contact with said lever. This step in the process of manufacture is introduced to lessen or efface entirely the traces of the initial contact differences, such differences being lessened or effaced by permitting the inner heat of the parison to flow outwardly to the colder zones or spots of its outer strata, thereby restoring to them uniformity of temperature and malleability before the stretching of the parison is allowed to take place and thus insure much more uniform thickness.

The dog 41 now comes into operative relationship with the bell crank lever 45, renders the clutch 17 operative and effects the driving of shaft 3 and disks 4, 5. This movement of the disks 4, 5 causes the bottom mold 101 to be removed and replaced by the bottom mold 103 which is however sufficiently clear of the parison to admit of the subsequent stretching process. As soon as this change has been effected, the dog 41 is clear of the bell crank lever 45 and the stretching of the parison commences, such stretching being assisted, if required or desired, by the admission of puffs of low pressure air within the parison by the action of the pins 200 on their valve in the triple valve casing 132. The contact of dog 42 with the bell crank lever 45 again sets the shaft 3 in motion and causes the cam groove 11 of the disk 5 to close the halves of the finishing mold about the parison, whereupon the finish blowing takes place while the controlling wheel 24 is moving forward for dog 43 to become operative, the air being admitted by the action of a dog movably attached to the control wheel 24 and actuating the same valve as the pin 200. When the dog 43 acts upon clutch 17 and thus starts the disks 4, 5, several of the cam grooves upon these disks become operative and effect in due coördination the following steps:—

(1) The opening of the halves of the finishing mold 85;

(2) The withdrawal of the bottom mold 103;

(3) The opening of the halves of the neck mold 71, thereby releasing the bottle and allowing it to drop into the cooling pot 117;

(4) The closing of the halves of the parison mold;

(5) The rotation of the parison mold and of the neck mold together through 180 deg., to the position shown in Fig. 2 ready to receive a new charge.

When the firing mold is closed for finish blowing, the projections 85ª encounter the locking members 71ª and cause them to move about their pivots so that the projections 85ª eventually move clear of and come behind the said members: when the finishing mold is opened at the conclusion of finish blowing, the projections 85ª press against the locking members 71ª, which, by reason of their stops, are immovable; the two portions of the neck mold 71 are thus caused to move apart. At the moment at which the projections 85ª escape the locking members 71ª, the two parts of the neck mold 71 come together under the influence of the spring 71ᵇ.

While a new parison is being formed and transferred to the finishing mold, the previously blown bottle remains in the cooling pot, whence it is ejected to the slideway 130 (leading to the annealing furnace) by the opening of the two halves of the cooling pot 117 and the tilting of the bottom 123 just before a new bottle is ready to be freed from the neck mold.

It will be seen that the control wheel 24 makes a complete revolution for each cycle, and that a cycle corresponds to the manufacture of a bottle. It will be also understood that the several operations controlled by the control wheel can be regulated at will either by displacing the dogs and pins relatively to one another or by modifying the length of the dogs or the spacing of the pins. In this manner it is possible to permit of all desirable modifications of duration of the different phases in the manufacture of a bottle, and to adapt the machine to all conditions of manufacture. It will also be seen that the disks 4, 5 are stationary during the glass working phases and are in motion for the purpose of opening or closing the several molds, transferring the parison and ejecting the finished bottle, etc.

The machine also comprises a means for producing the "set-in" reëntering bottom of a bottle and for this purpose the bottom 123 may be made in two parts, the central part 123ª being the tool or spigot which is controlled by a frame 151 linked to a lever 152 keyed upon the shaft 153. The latter is operated by a lever controlled by a movable cam (not shown) on the controlling wheel 24 adapted to impart a very slow ascending movement to the spigot 123ª. 154 is a stop, adjustable as to height, mounted upon an axis 155. This stop is moved above the neck of the bottle to prevent the ascending movement of the bottle during the time the re-entering takes place. The stop 154 derives its movement from the shaft 68 which controls the opening and closing of the parison mold, and its axis 155 is connected therewith through a crank 156, a link 157 and lever 158.

Figure 3:
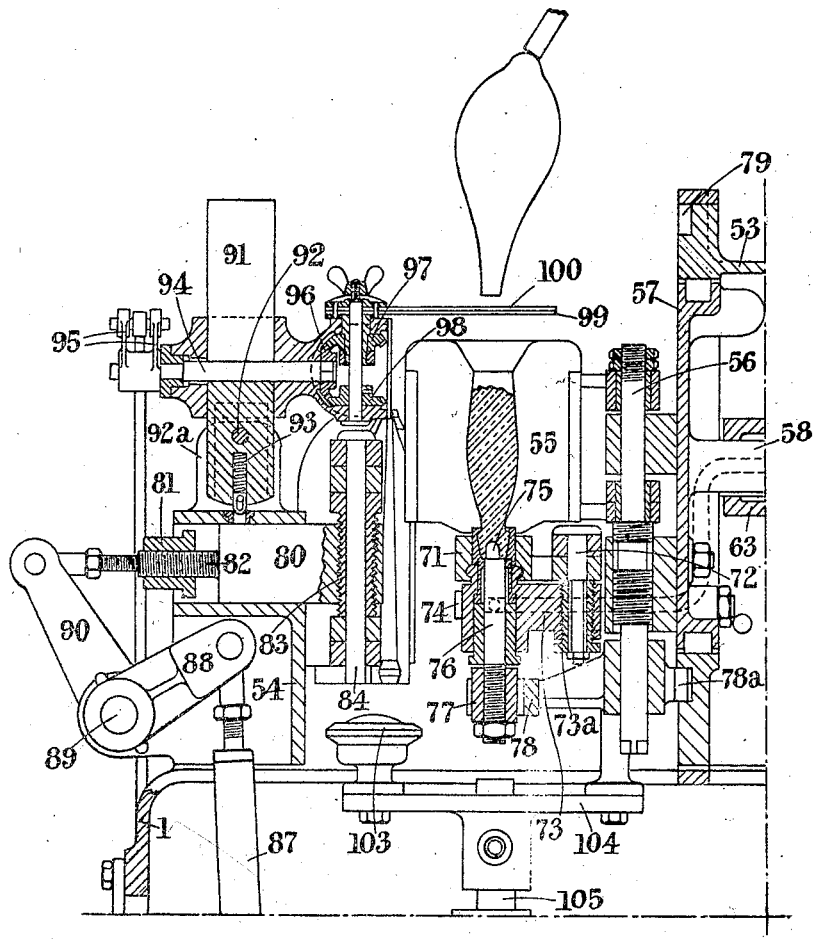
Fig. 3 is a sectional view of the upper portion of Fig. 2, but to a larger scale.

The method of withdrawing the plunger 75 from the parison, as illustrated by Fig. 3, cannot be used in the case of bottles with internal screw threads.

For bottles of that class, it becomes necessary, when withdrawing the plunger, to rotate it and simultaneously move it in its axial direction in accordance with the pitch of the screw.

Figure 12:
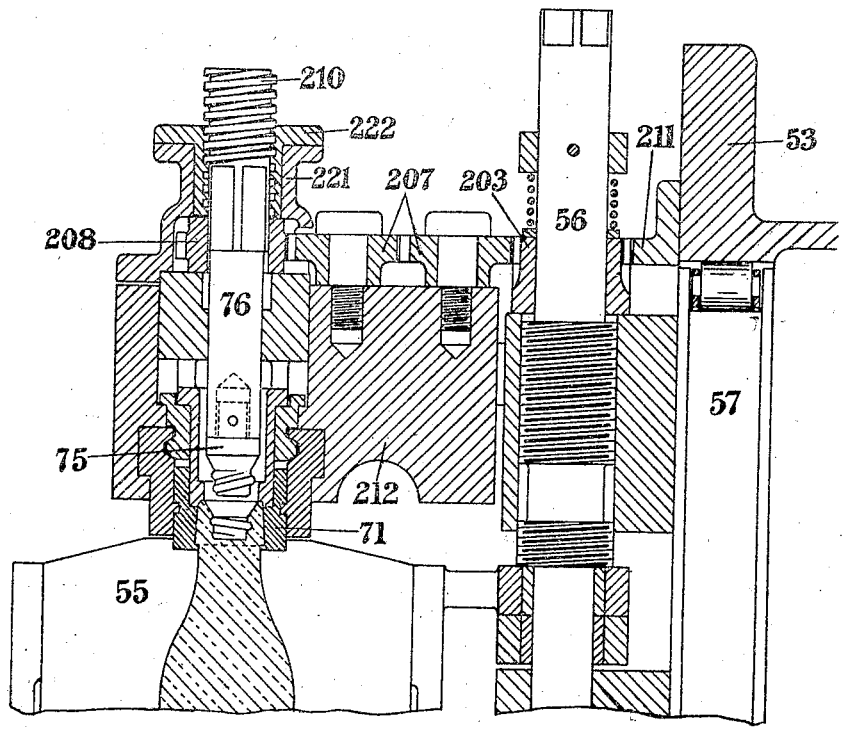
Fig. 12 is a view showing the application of a plunger adapted for use in connection with the manufacture of screw-stoppered bottles.

Fig. 12 shows how this is effected. Instead of the cam groove 79, shown in Fig. 3, the casing 53 is provided with a toothed crown 211 into which meshes a pinion 203 capable of turning freely on the spindle 56. Two free-running pinions 207 mounted on arm 212 (replacing arm 73 shown in Fig. 3) connect pinion 203 with pinion 208 in the square hole of which the middle part of plunger carrier 76 is a sliding fit. The upper part of the plunger carrier forms a screw 210, the pitch of which corresponds with the pitch of the screw on the plunger 75, and is fitted in a nut 222 which may be bolted to the hollow block 221 in different positions by means of circular slots in its flange.

During the reversing motion, when the arm 212 and the parison mold 55 revolve with plate 57, carrying pinion 203 around with them while meshing with the fixed toothed crown 211, the train of gears 203, 207 and 208 causes the plunger carrier 76 to revolve and, owing to its connection with screw 210 and nut 222, to simultaneously move out of the glass previously poured around the plunger 75, thereby leaving a threaded aperture in the top of the parison free to receive the compressed air blast for blowing same. By adjusting the nut 222 circumferentially as regards assembling crown 221, a very fine height adjustment is obtainable for the plunger 75 so as to insure its matching perfectly with the lip of the bottle neck at the end of the downward rotation of plunger carrier 76.

What I claim is:—

1. In a machine for the manufacture of hollow glass articles, comprising glass-manipulating apparatus having a plurality of glass-working periods, and including means for maintaining the parison, prior to stretching, in a quiescent state with the major surface thereof free from metallic contact for a period permitting equalization of the temperature of the parison, and automatic means determining the commencement and ending of said equalization period and adjustable to vary the duration of the same.

2. In a machine for the manufacture of hollow glass articles, comprising glass manipulating apparatus having a plurality of glass working periods, and including means for maintaining the parison, prior to stretching, in a quiescent state with its major surface in contact with the air for a period permitting equalization of the heat of the parison, and automatic means comprising a control device having automatic clutch-controlling means adjustable to vary the duration of said heat-equalization period.

3. In a machine for the manufacture of hollow glass articles, comprising automatic glass manipulating apparatus having a plurality of glass-working periods, and including parison molding means adapted to receive glass from above, and means for operating the parison molding means and maintaining the parison, prior to stretching, in a quiescent state after the major portion of said parison molding means is removed for a period during which the heat of the parison is allowed to become equalized.

4. In a machine for the manufacture of hollow glass articles, comprising automatic glass manipulating apparatus having a plurality of glass-working periods and including parison molding means adapted to be filled from above, means for operating the parison molding means and maintaining the parison, prior to stretching, in a quiescent state after the major portion of said parison molding means is removed for a period during which the heat of the parison is allowed to become equalized, and automatic means to control the time of said equalization period and adjustable to vary the same.

5. In a machine for the manufacture of hollow glass articles, comprising automatic glass-manufacuring apparatus including means for molding the parison, means for removing the major portion of the molding means from the parison and supporting, by the remaining molding portions, the parison in a quiescent state prior to stretching for a period of time permitting heat-equalization thereof.

6. A machine for the manufacture of hollow glass articles comprising parison molding means including a body mold, a neck mold and a movable bottom, means for removing the body mold from the parison, automatic means to effect a stoppage in the operation of the machine while the bottom mold is in its initial molding position and in contact with the parison to effect the equalization of the heat of the parison prior to stretching, and means to automatically remove the bottom to permit the parison to stretch suspended from the neck mold and after the allotment of said heat-equalization period.

7. A machine for the manufacture of hollow glass articles, comprising means for molding the parison, including a neck mold, bottom mold, and side molds, means for blowing the parison and subsequently freeing it from contact with the side molds, means for stopping the machine after the parison is freed from the side molds and while maintaining the parison in a quiescent state prior to stretching between the bottom mold and the neck mold to equalize the temperature of the parison, means for removing the bottom mold, means for again stopping the machine after removal of the bottom mold to permit the parison to stretch, and automatic means to determine the commencement and ending of said stoppage periods and adjustable to vary the duration of said periods.

8. A machine for the manufacture of hollow glass articles comprising a parison mold and means for operating the same, a power drive, means for connecting the mold operating means to said power device and including a device having a rate corresponding to the time cycle of the machine and provided with a plurality of contact pieces controlling the connection of said mold operating means to the power drive and arranged to create a pause between two mold operations to permit of the equalization of the heat of the parison prior to stretching and in a quiescent state, said pieces being adjustable to vary the duration of said equalization period.

9. A machine for automatically manufacturing hollow glass articles, comprising a reversible mold adapted to be filled from above and having a neck mold, body molds, and bottom mold, means for bringing said parison mold into upright position after the same is filled, means for opening the body molds, means for lowering the bottom mold to permit stretching of the parison, and mechanism for actuating all of said means and including automatic means to effect stoppage of the machine after the body molds are opened and prior to the lowering of the bottom mold to bring about equalization of the temperature of the outside and inside of the parison.

10. A machine for automatically manufacturing hollow glass articles, comprising a reversible mold adapted to be filled from above and having a neck mold, body molds, and bottom mold, means for bringing said parison mold into upright position after the same is filled, means for opening the body molds, means for lowering the bottom mold to permit stretching of the parison, and mechanism for actuating all of said means and including automatic means to effect stoppage of the machine after the body molds are opened and prior to the lowering of the bottom mold to bring about equalization of the temperature of the outside and inside of the parison, said last mentioned means being adjustable to vary the duration of such stoppage period.

11. A machine for automatically manufacturing hollow glass articles, comprising a reversible parison mold adapted to be filled with liquid glass from above and having a neck mold, body molds and bottom mold, means for bringing said parison mold into upright position after it is filled, means for opening the body molds, means for lowering the bottom mold to permit stretching of the parison, means for actuating the apparatus, and means for automatically stopping the machine after the body molds are opened and prior to lowering the bottom mold to retain the parison in a quiescent state prior to stretching for a period permitting heat-equalization, said automatic stopping means having a control disk actuated at the rate of the cycle of the machine and adjustable dogs on the disk which disconnect the machine from the source of energy.

Dated this 8th day of February 1917.

ARTHUR WILZIN.